United States Patent [19]
Rose

[11] 3,756,141
[45] Sept. 4, 1973

[54] APPARATUS FOR MELTING AND TEMPERING CHOCOLATE

[76] Inventor: Lewis D. Rose, 3339 Eagle Blvd., Orlando, Fla. 32804

[22] Filed: Oct. 28, 1971

[21] Appl. No.: 193,513

[52] U.S. Cl............... 99/348, 165/109, 219/10.69, 219/421, 219/469
[51] Int. Cl.............................................. A23g 1/18
[58] Field of Search ............... 99/236 CC, 23, 403, 99/324, 485, 348; 118/20, 27; 34/20; 165/109, 348; 219/201, 214, 10.69, 421, 469

[56] References Cited
UNITED STATES PATENTS

| | | | |
|---|---|---|---|
| 2,469,709 | 5/1949 | Ashworth et al. | 99/236 CC |
| 2,704,722 | 3/1955 | Barton | 165/109 X |
| 1,673,395 | 6/1928 | Clark | 99/403 UX |
| 1,344,638 | 6/1920 | Kinsman | 99/236 UX |

Primary Examiner—Leon G. Machlin
Attorney—Robert W. Duckworth et al.

[57] ABSTRACT

A portable chocolate mill for controllably melting and feeding chocolate from a bar to a receiving pan which is controllably heated so as to maintain the melted chocolate at a tempering temperature and make it readily available for use in a candy making process.

2 Claims, 3 Drawing Figures

PATENTED SEP 4 1973
3,756,141
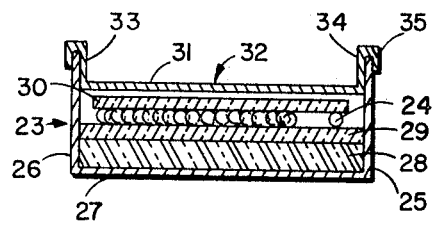
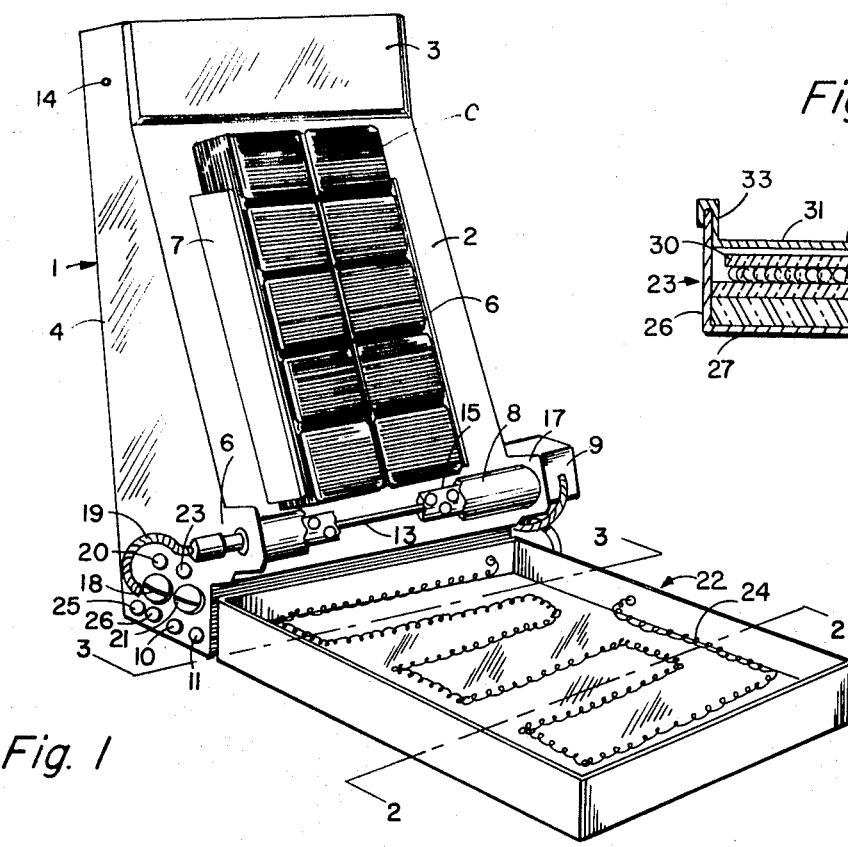
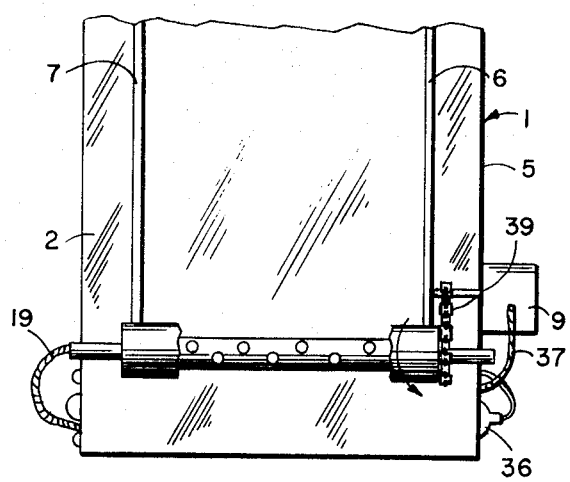
INVENTOR.
Lewis D. Rose
BY Duckworth & Hobby
ATTY'S.

APPARATUS FOR MELTING AND TEMPERING CHOCOLATE

BACKGROUND OF THE INVENTION

The present invention relates to an apparatus for controllably melting and tempering chocolate. In effect, this invention allows the candy making industry to come out of the back room and take the chocolate mill out into the front area of a candy store while making candy in full public view. Further, it provides a portable device whereby only the chocolate needed at any one time is melted and tempered for use.

In the past, such chocolate mills have consisted of several pieces of machinery such as double boilers for melting and tempering chocolate and warming or candy rolling tables which are used by the confectioners to keep the chocolate in a warm and molten condition during the candy making process. Chocolate after being melted is normally transferred from the melter to the warming table. This is a complicated and messy procedure requiring care.

Chocolate is used primarily in the candy industry as a coating for various types of candies, for example, cordial cherries, french creams, nuts and cordials, etc. In order to present a proper appearance in such use, chocolate must be properly tempered. If the chocolate used as a coating is not properly tempered, it will streak and turn white due to the fats and oils separating from the chocolate mass.

Tempering of natural chocolate has in the past generally been accomplished by grating or cutting the chocolate into small pieces and heating at a temperature of 100° F such as in a double boiler while stirring to melt completely. The melted chocolate is then reduced in temperature to a temperature between 60° F and 80° F and finally the temperature of the melt is raised to approximately 85° F for use in the various candy making processes. The above process must be conducted with extreme care so as to prevent any moisture from the double boiler getting into the chocolate or the temperature from rising above 100° F as either will cause the chocolate to change color and be unfit for use as a candy coating. While it is recognized that heat treatment of artificial chocolates are not as critical as with the natural chocolates, my novel apparatus is equally useful in this handling of artificial chocolate in the confectioners arts.

The present invention solves many problems which has in the past plagued the candy makers. It provides a simple and efficient piece of machinery which can be used to melt and feed the proper amount of chocolate to a warm pan where the melted chocolate is tempered and made ready for use in the candy making process without the difficult transferring process.

SUMMARY OF THE INVENTION

The present invention relates to a portable chocolate mill or apparatus which is used for the melting and tempering of chocolate both natural and artificial for use by confectioners. The apparatus has a casing which serves to house the necessary electrical apparatus to control the operation of the melting and tempering of the chocolate. Said housing also provides means for supporting a chocolate bar which will be melted and transferred to the working surface of the candy pan by an associated heated roller which is attached to the support housing. Removably associated with said support housing is a heated receiving pan or candy working surface which is adapted to collect the molten chocolate in a heated condition and temper and hold the same pending its association with the other ingredients of the candy to be made by the confectioner.

BRIEF DESCRIPTION OF THE DRAWINGS

Other objects, features and advantages will become apparent from a study of the written description with reference to the accompanying drawing, wherein FIG. 1 is a perspective view of chocolate mill showing a bar of chocolate in position for being melted and with the pan for receiving the melted chocolate removed;

FIG. 2 shows a cross section of the chocolate receiving portion of the mill along line 2—2 of FIG. 1;

FIG. 3 shows a front view of the chocolate mill along line 3—3 of FIG. 1.

DESCRIPTION OF THE PREFERRED EMBODIMENT

Referring now to FIG. 1, and upstanding housing 1 which is shown in perspective view having an inclined surface 2, vertical sides 4 and 5, and a back and bottom portion not shown. At the upper-most portion of said housing 1, is located an opaque area 3, which may be used for advertising material if desired. Said opaque surface 3, being illuminated by an electric lamp (not shown) which is activated by light switch 14. The inclined surface 2 is provided with guide members 6 and 7 which serve to guide a chocolate bar (C) which is supported on inclined surface 2 prior to its being melted and tempered. The chocolate bar is melted at a controlled rate by roller 8 which has therein a perforated cylinder 15 and a heating element 13 located therein. Said feed roller 8 is driven by motor 9, which is controlled by switch 10. Signal light 11 is a signal light which shows whether or not power is being supplied to motor 9. Roller 8 is supported on the housing member 1 by support means 16 and 17 located on either side of said housing member attached to vertical sides 4 and 5 respectively. The temperature of the roller 8 is maintained at approximately 100° F by heat which is supplied by heating rod 13, the heat radiating through perforated cylinder 15 onto the roller. The temperature of heating rod 13 may be varied between 90° F and 180° F by switch 18 through electrical conduit 19. When switch means 18 is activated providing current to heating rod 13 signal light 20 is activated showing that power is being supplied to the heated roller 8. Switch 21 serves to activate the heating coils in the candy receiving tray 22. When said switch 21 is activated, signal light 23 is lit. The candy receiving tray 22 is provided with heating elements 24 which serve to provide heat to candy pan 23 shown in FIG. 2. Safety light 25 serves to notify the user of any current that is passing through any of the circuits of the machine.

Fuse holder 26 provides complete protection to the chocolate mill and will blow to discontinue the flow of electrical current to the machine if any of the heating element overheats.

Referring now to FIG. 2 which is a cross-section view taken along line 2—2 of FIG. 1, the candy receiving tray 23 is comprised of a rectangular metal pan having side walls 25 and 26 and a bottom 27 and two ends not shown. Inside of said candy receiving tray is a bottom layer of spun glass 28 which serves to insulate the bottom portion of working surface of the table (not shown) which supports the entire chocolate mill from heating element 24. Super-imposed on spun glass layer 28 is asbestos sheet 29 which serves to further insulate the support table (not shown) and provide a base for the heating coils 24. Supported on said heating coils is a second asbestos sheet 30 which serves to prevent the heat of the heating coils 24 from radiating directly on the bottom surface 31 of the candy pan 32. The side portions 33 and 34 of said candy pan terminate in a lip 35 which serves to overlap the ends and sides of receiving tray 23. Candy pan 32 is supported by its vertical side members so as to be above and not resting on the asbestos sheet 30 and bottom surface of the candy pan 31 so as to allow the heat radiating from heating element 24 to be uniform across the bottom of the candy pan 32 preventing the formation of "hot spots" and maintains the chocolate in the candy pan at a temperature of from 80° F to 85° F.

Referring to FIG. 3, cable 36 is connected to an electrical receptacle (not shown) in the support housing 1 which is connected by electrical circuiting not shown to switch 21 which serves to control the amount of current and thus the heat supplied to candy pan 32 in the manner previously described. Motor 9 controlled by switch 10 through conduit 37 drives heated roller 8 by means of a sprocket and chain drive 39. The roller 8 controlled by motor 9 rotates outwardly from housing 1 causing the chocolate melted from the bar supported of inclined surface 2 to flow over the top and outside roller 8 and drip into candy pan 32. I have found that my chocolate mill operates with optimum results if heated roller 8 is rotating at a speed of from six to 10 revolutions per minute.

This invention is not to be construed as limited to the particular forms described and disclosed herein, since these are to be regarded as illustrative rather than restrictive.

I claim:

1. Apparatus for melting and tempering chocolate type materials comprising in combination:
    a. an upright member having an inlined surface for supporting a bar of chocolate type material to be melted and tempered, said inclined surface having a bottom and a top edge;
    b. a feed roller rotatably attached to said upright member at the bottom edge of said inclined plane, said roller having at least one heating element therein for heating said roller to a predetermined temperature to melt a bar of chocolate material while feeding said bar by the rotation of said roller, said roller supporting said bar of chocolate on said inclined surface;
    c. a controllable heated receiving means attached to said upright member and located below said feed roller and below the bottom edge of said inclined surface to receive and temper said melted chocolate from said bar of chocolate type material.

2. The apparatus for melting and tempering chocolate type materials as defined in claim 1 wherein the receiving means is comprised of a support pan having therein controllable heating elements and supporting a removable melt receiving surface.

* * * * *